United States Patent [19]

Gagliardo

[11] Patent Number: 5,311,031
[45] Date of Patent: May 10, 1994

[54] METHOD AND DEVICE FOR DETECTING FULL CONDITION IN A RECEIVING MAGAZINE OF A FILM HANDLING APPARATUS

[75] Inventor: Andrea Gagliardo, Cosseria, Italy

[73] Assignee: Minnesota Mining and Manufacturing Company, St. Paul, Minn.

[21] Appl. No.: 29,160

[22] Filed: Mar. 10, 1993

[30] Foreign Application Priority Data

Mar. 27, 1992 [IT] Italy .................. MI92A000728

[51] Int. Cl.$^5$ ........................................ G01N 21/86
[52] U.S. Cl. ........................ 250/561; 250/223 R
[58] Field of Search ............... 250/223 R, 561, 560; 271/258, 259; 356/4, 375, 381

[56] References Cited

U.S. PATENT DOCUMENTS

| | | | |
|---|---|---|---|
| 3,278,754 | 10/1966 | Wallace | 250/561 |
| 3,902,713 | 9/1975 | Von Luhmann et al. | 250/561 |
| 4,652,742 | 3/1987 | Wauer et al. | 250/223 R |
| 4,978,845 | 12/1990 | Hill | 250/222.1 |
| 5,225,689 | 7/1993 | Buckle et al. | 250/561 |

Primary Examiner—David C. Nelms
Attorney, Agent, or Firm—Gary L. Griswold; Walter N. Kirn; Mark A. Litman

[57] ABSTRACT

To provide a simple way to control full magazine condition in apparatus where films driven to the receiving magazine rest therein one on the other, the method provides for the following steps: sending an IR light signal toward the films in the magazine; letting the signal be reflected by the last arrived film; collecting the reflected signal with a photosensor; having the photosensor emit an alarm signal when the intensity of the light collected thereby is greater than threshold value of the photosensor itself, thereby showing that the last arrived film is too near to the photosensor, because the magazine is full; repeating the above steps every time a film is fed. This method allows also film jammed detection out side the magazine.

19 Claims, 2 Drawing Sheets

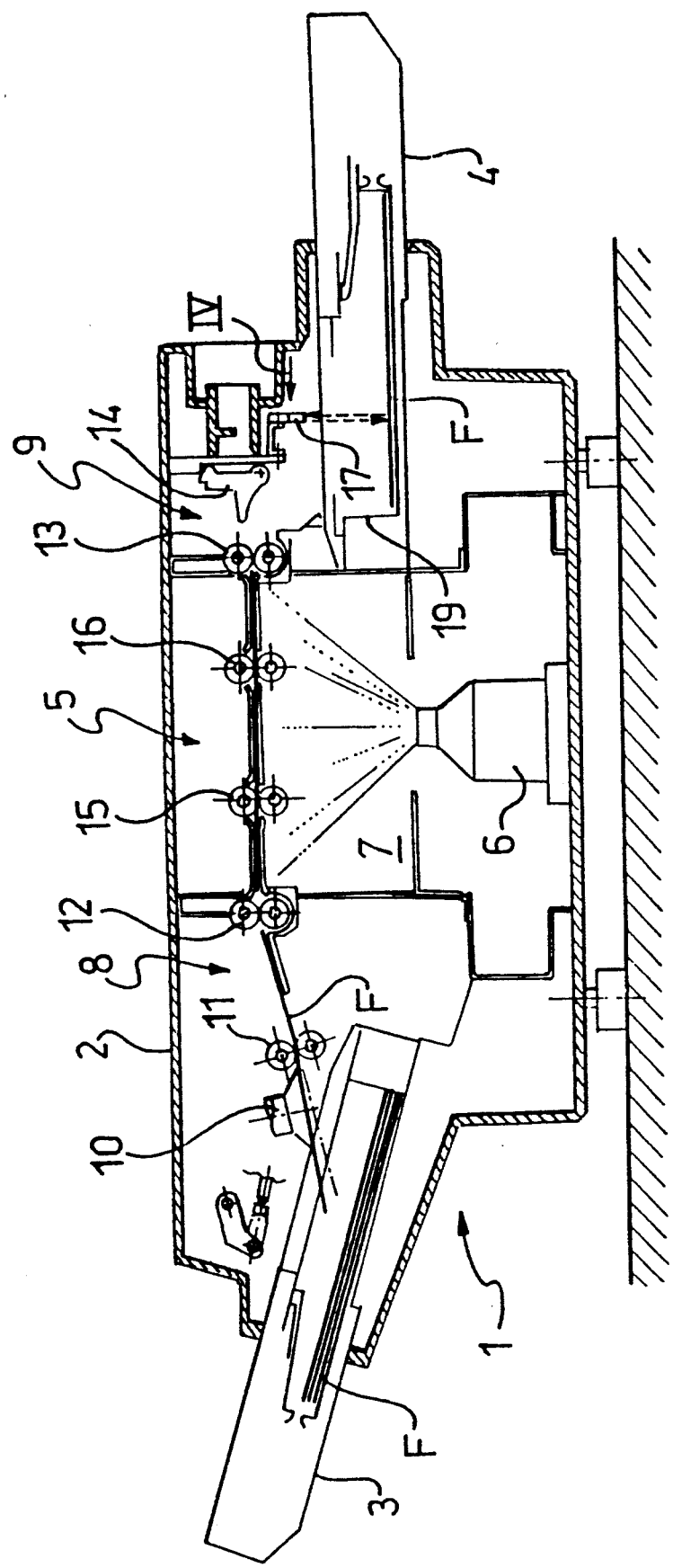
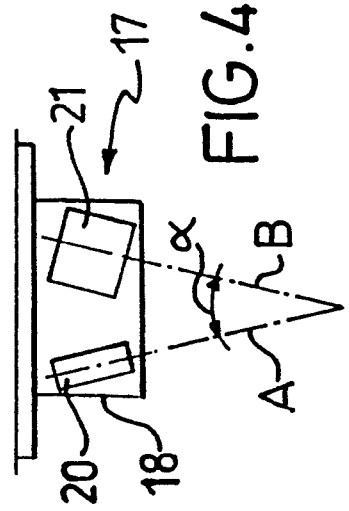

METHOD AND DEVICE FOR DETECTING FULL CONDITION IN A RECEIVING MAGAZINE OF A FILM HANDLING APPARATUS

FIELD OF THE INVENTION

The present invention relates to a method for detecting a film jam and/or full magazine conditions in a film receiving magazine of a film handling apparatus and to a device to perform such method.

BACKGROUND ART

In photographic film handling apparatus, usually films are driven along a film path to the receiving magazine in which they rest one on the other. Apparatus of this kind are, for example, the so-called imagers, in which a recorded image is transferred to a photographic film in order to be seen by the physician more easily.

In such apparatus, it is necessary at least to indicate that the receiving magazine is full or that a jam occurred in the film path outside the magazine and before the film enters it, and possibly to inhibit operation when such a condition occurs.

Full condition of the magazine cannot be controlled by counting the number of films; in fact, the overall thickness of a stack of photographic films which are individually placed one over the other may vary considerably according to the environmental conditions (temperature, humidity) and to the inclusion of air layers.

Therefore, the actual thickness of the stack of films is to be controlled. To do this, devices are known which include an arm which is moved onto the films in the magazine every time a film is fed, the arm is stopped at a predetermined position corresponding to the full magazine condition, and a microswitch is operated if contact occurs between the arm and the films. Such devices, however, are rather complicated, little accurate, and slow.

BRIEF DESCRIPTION OF THE INVENTION

The problem underlining this invention is to provide a simple way to control a full magazine condition.

Therefore, in a first aspect, this invention relates to a method for detecting full magazine conditions in a film receiving magazine of a photographic film handling apparatus, wherein films are driven along a film path to the receiving magazine in which they rest one on the other, characterized by comprising the steps of:

sending an IR light signal toward the films in the magazine;
letting the signal be reflected by the last arrived film;
collecting the reflected signal with a photosensor;
having the photosensor emit an alarm signal when the intensity of the light collected thereby is greater than the threshold value of the photosensor itself, thereby showing that the last arrived film is too near to the photosensor, because the magazine is full;
repeating the above steps every time a film is fed.

In this way, the height of the stack of films in the receiving magazine is controlled optically, without the need of moving parts of any kind; thus, a device operating according to this method is much simpler, extremely accurate and very quick, as well as very reliable.

Besides, it has been verified that film jams may occur outside the receiving magazine in the film path before the film enters the magazine.

Therefore, the method of the invention also enables detection of film jams outside the receiving magazine.

It may be preferred to employ the method of the invention to detect only the full magazine condition or only the film jam condition. In the former instance, the power of the IR signal is so selected as to have the alarm signal emitted by the photosensor when the distance between the last arrived film and the photosensor corresponds to the full magazine condition, the alarm signal being a full magazine condition signal. In the latter instance, the power of the IR signal is so selected as to have the alarm signal emitted when the distance between the last arrived film and the photosensor corresponds to a film jam condition, the alarm signal being a film jam condition signal.

Preferably, however, the method of the invention may be employed to detect selectively both alarm conditions. In such instance, the method comprises the steps of:

sending a first IR light signal having a first lower power toward the films in the magazine;
letting the signal be reflected by the last arrived film;
collecting the reflected signal with a photosensor;
having the photosensor emit a film jam alarm signal when the intensity of the light collected thereby is greater than the threshold value of the photosensor itself, thereby showing that the last arrived film is at a distance from the photosensor which corresponds to the position of a jammed film;
sending a second IR light signal having a second higher power toward the films in the magazine;
letting the signal be reflected by the last arrived film;
collecting the reflected signal with the photosensor;
having the photosensor emit a full magazine alarm signal when the intensity of the light collected thereby is greater than the threshold value of the photosensor itself, thereby showing that the last arrived film is at a distance from the photosensor which corresponds to the full condition of the magazine;
repeating the above steps every time a film is fed.

Preferably, the IR light signal is generated by a LED and the photosensor is a phototransistor, these electronic components being both simple, cheap, reliable and perfectly suitable to the purpose. In particular, with the IR light emitted by a LED, different emission powers may be easily obtained by feeding the LED with currents of different intensity.

According to the present invention, the IR light signal necessary for having the alarm signal emitted by the photosensor is predetermined, under variation of the IR light intensity, in jammed film or full magazine conditions and is function of the distance of the film from the photosensor under jammed film or full magazine conditions and of the employed film type.

In a further aspect, the invention relates to a device for detecting film jam outside a magazine and/or full magazine conditions in a film receiving magazine of a photographic film handling apparatus, wherein films are driven along a film path to the receiving magazine in which they rest one on the other, characterized by comprising an IR light source and an IR photosensor, placed over the magazine and oriented thereto, the light source and the photosensor being tuned so as to have an alarm signal emitted by the photosensor when the intensity of the light collected is greater than the threshold value of the photosensor itself, thereby showing that the last arrived film is too near to the photosensor, because of a jam or because the magazine is full.

This device is designed to perform the above mentioned method.

Preferably, the IR light signal is generated by a LED and the photosensor is a phototransistor, the LED and the phototransistor being mounted in the same case, one close to the other with a convergence angle of less than 10°.

Further features and advantages will become apparent from the following description of a preferred embodiment of device according to the invention, performing the method of the invention.

BRIEF DESCRIPTION OF DRAWINGS

FIG. 1 is a sectional view of a film handling apparatus (an imager) embodying the invention.

FIG. 4 is a view of a detail of the apparatus of FIG. 1, taken from the direction of the arrow IV.

DETAILED DESCRIPTION OF A PREFERRED EMBODIMENT

Figure 2:
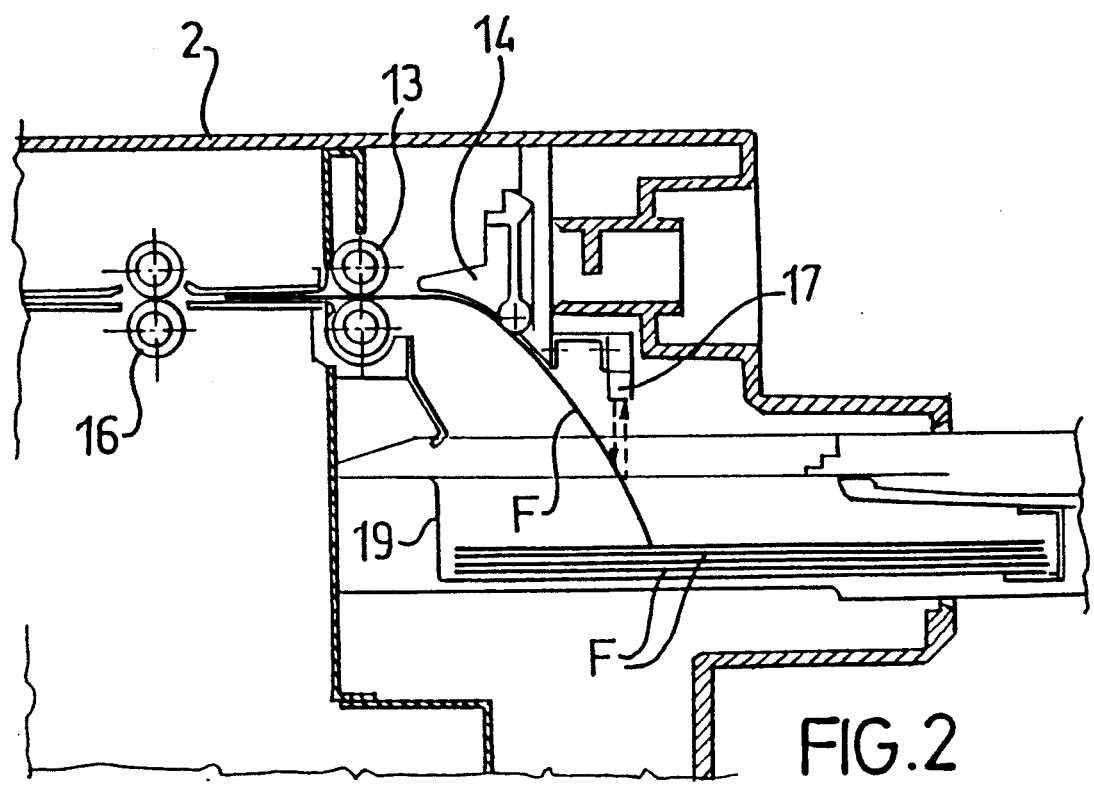
FIG. 2 is a sectional view of the receiving magazine of the apparatus of FIG. 1, while detecting a film jam condition.
Figure 3:
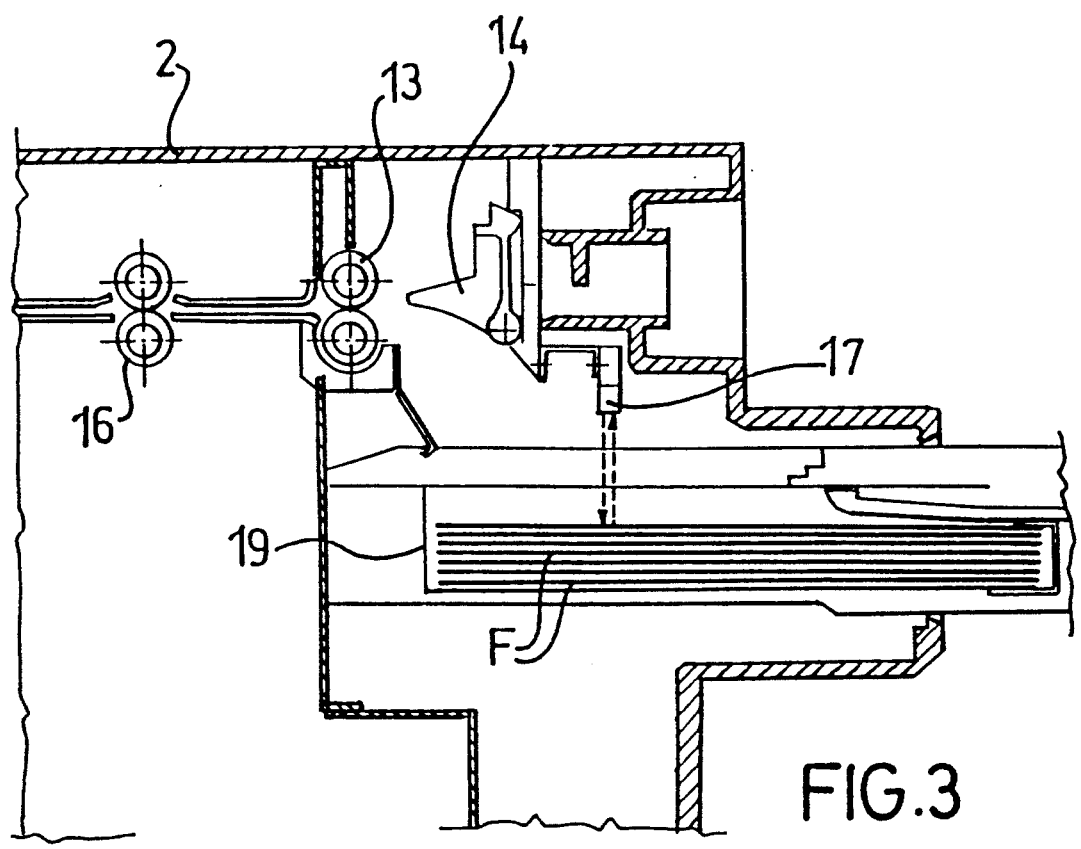
FIG. 3 is a sectional view of the receiving magazine of the apparatus of FIG. 1, while detecting a full magazine condition.

In the drawings, an imager apparatus 1 is shown as an example of a film handling apparatus.

The imager apparatus 1 comprises a light tight casing 2, supporting two magazines for photographic films F: a feed magazine 3 for the unexposed films and a receiving magazine 4 for the exposed films. The two magazines 3 and 4 are light tight per se and are light tight connected to the casing 2 in any known manner.

The casing 2 comprises an exposure site 5, in the upper portion of the casing 2, and projection means 6, in the lower portion of the casing 2 in a position substantially opposite to the exposure site 5. An empty room 7 is comprised within the casing 2 between the projection means 6 and the exposure site 5.

A primary film path 8 extends between the feed magazine 3 and the exposure site 5; a secondary film path 9 extends between the exposure site 5 and the receiving magazine 4. Film path 8 comprises a pick-up suction device 10, a first pair of rollers 11 and a second pair of rollers 12, at the entry of the exposure site 5. Film path 9 comprises a first pair of rollers 13 at the exit of the exposure site 5 and a shaped guide portion 14.

At the exposure site 5, between the rollers 12 and 13, there are provided two pairs of wheels 15 and 16, acting on the film F.

Wheels 15 and 16, as well as rollers 11, 12 and 13, are driven by driving means, known per se and not shown in the drawings.

The apparatus 1 further comprises a device 17 for detecting both film jam outside the receiving magazine 4 and full condition of the magazine 4 itself.

The device 17 comprises a case 18, mounted to the casing 2 of the apparatus right over a portion 19 of the receiving magazine 4 inside the casing 2. Case 18 houses a LED 20 and a phototransistor 21, placed side by side not parallel to each other, but at an angle, as will be described in the following.

The LED 20 emits infra-red (IR) light, having an intensity depending upon the current with which the LED 20 is fed: the higher the current, the higher the light power. IR light is chosen because such light does not form a latent image on the photographic film; lights having shorter wavelength might damage the films by causing undesired exposure thereof.

The phototransistor 21 is a photosensor capable of sensing IR light having intensity over the fixed intensity threshold of the photosensor, by emitting an electric signal.

The LED 20 and the phototransistor 21 act along respective axes A and B; this means that the LED 20 emits a light beam in the direction of the axis A, while the phototransistor 21 collects light from a sensing surface perpendicular to axis B, arriving thereat along the axis B or with a maximum inclination relative to such axis.

In the case 18, the LED 20 and the phototransistor 21 are oriented toward the films and positioned in such a way that axes A and B form an angle of few degrees, not greater than 10° or may be parallel when the light beam emitted by LED 20 is not puctiform and therefore reflected light is easily collected by phototransistor 21.

Operation of the apparatus 1 is as follows.

To have a certain image exposed onto a film, a film F is taken from the feed magazine 3 by the pick-up device 10 and is fed via the path 8 to the exposure site 5, where it is exposed. Then, the exposed film is driven via the path 9 to the receiving magazine 4, where it lies on the film already present (or on the bottom of the magazine, if it is the first film).

Thereafter, the device 17 is operated, in the sense that LED 20 is fed with a first, low intensity, current, so that it emits a first, low energy, IR light beam. This light beam, oriented toward the last arrived film F, hits against the film F, being partially reflected back to the device 17. The reflected light beam is finally collected by the phototransistor 21.

If the film F is correctly placed in the magazine 4, the length of the forward and backward path run by the IR light makes the light so weak that it remains below the threshold of the phototransistor 21. Therefore, no signal is emitted.

If, instead, the film F is jammed outside the receiving magazine 4, the forward and backward path of the light results shortened; the first power of the emitted light is selected so that in this instance the reflected light arrives at the phototransistor 21 with an intensity over the threshold. Therefore an alarm signal is emitted, particularly a film jam alarm.

Immediately thereafter, the device 17 is again operated, in the sense that LED 20 is fed with a second, higher intensity, current, so that it emits a second, higher energy, IR light beam.

If the magazine 4 is not full yet and no film jam occurred, the length of the forward and backward path run by the IR light makes the light so weak that it remains below the threshold of the phototransistor 21. Therefore, no signal is emitted.

If, instead, the magazine 4 is full after the arrival of the film F, the forward and backward path of the light is shortened; the second power of the emitted light is selected so that in this instance the reflected light arrives at the phototransistor 21 with an intensity over the threshold. An alarm signal is then emitted, particularly a full magazine alarm.

Alarm signals generated by the phototransistor 21 are collected and handled by a computerized system (not shown), which may use such signals in different ways, for example to inhibit operation of the apparatus, to activate automatic procedure to remove jammed film, or simply to switch on alarm lights.

The cycle is repeated any time a film is fed, to have full control.

It may be preferred to have the second part of the cycle (the emission of the second IR light beam) omitted in case a film jam is detected in the first part. Vice-versa, it may be preferred to have the whole cycle performed irrespective upon the signals generated. In such a case, of course, in the second part an alarm signal would be emitted (because of the presence of the jammed film) even if the magazine is not full. The computer system will have to recognize this situation.

In an embodiment of the present invention, LED 20 is an infrared emitting diode of the LD 271 type produced by Siemens (fed with a current intensity in the range from 20 to 220 milliAmpere) and phototransistor 21 is of the BP III type, produced by Siemens (which emits an alarm signal when it is struck by infrared radiation higher than the phototransistor threshold value).

The calibration operation is performed by a computer program (not shown) which scans the current intensity values fed to LED 20 up to reach the necessary value to have LED 20 emit an infrared radiation intensity which, when the film is jammed or the magazine is full, reaches the phototransistor 21 threshold value and operates the phototransistor 21 alarm signal. Such predetermined current intensity value is fed to LED 20 for the emission of the infrared signal delivered to the receiving magazine during the film loading operation and is such as to reach the phototransistor threshold value only when the film is jammed or the magazine is full.

In an embodiment of the present invention, such current intensity which operates the jammed film alarm signal is of 70 milliAmpere, when the film jams because it is still locked to the outlet roller couple 13 and is at a distance of 0.5 cm from phototransistor 21. On the contrary, the current intensity operating the full magazine signal is of 170 milliAmpere, when the magazine has 50 films inside (or anyhow a film number as to form a 1 cm high film stack), and the last arrived film is at distance of 6 cm from phototransistor 21.

The infrared radiation intensity emitted by LED 20 capable of operating the alarm signal of the phototransistor 21, further to depending, as seen above, upon the distance of the film from phototransistor 21, also depends upon the employed film type (since under variation of the film type, the infrared radiation quantity absorbed by the film itself varies as well). Even a calibration according to the employed film is therefore required.

The present invention is described in particular with reference to methods and devices for handling photographic films. Nevertheless, it is understood that the present invention is not limited to photographic films since it may be employed in systems moving sheets which are to be fed to a receiving magazine.

I claim:

1. A method for detecting at least one condition selected from the group consisting of a) film jammed outside a magazine and b) full magazine conditions in a film receiving magazine of a film handling apparatus, wherein films are driven along a film path to the receiving magazine in which they rest one on the other, characterized by comprising the steps of:
sending an IR light signal toward the films in the magazine;
letting the signal be reflected by the last arrived film in the magazine;
collecting the reflected signal with a photosensor;
having the photosensor emit an alarm when the intensity of the light collected thereby is greater than a threshold value of the photosensor itself, thereby showing that the last arrived film is too near to the photosensor, because of a jam or because the magazine is full; and
repeating the steps every time a film is fed.

2. Method according to claim 1, wherein the power of the IR signal is so selected as to have the alarm signal emitted when the distance between the last arrived film and the photosensor corresponds to a full magazine condition, the alarm signal being a full magazine condition signal.

3. Method according to claim 1, wherein the power of the IR signal is so selected as to have the alarm signal emitted when the distance between the jammed film and photosensor corresponds to a film jam condition, the alarm signal being a film jam condition signal.

4. Method according to claim 1, wherein the IR light signal is generated by a LED.

5. Method according to claim 1, wherein the photosensor is a phototransistor.

6. Method for detecting film jammed outside a magazine and full magazine conditions in a film receiving magazine of a film handling apparatus, wherein films are driven along a film path to the receiving magazine in which they rest one on the other, characterized by comprising the steps of:
sending a first IR light signal having a first lower power toward the films in the magazine;
letting the signal be reflected by the last arrived film;
collecting the reflected signal with a photosensor;
having the photosensor emit a film jam alarm signal when the intensity of the light collected thereby is greater than the threshold value of the photosensor itself, thereby showing that the last arrived film is at a distance from the photosensor which corresponds to the position of a jammed film;
sending a second IR light signal having a second higher power toward the films in the magazine;
letting the signal be reflected by the last arrived film;
collecting the reflected signal with the photosensor;
having the photosensor emit a full magazine alarm signal when the intensity of the light collected thereby is greater than the threshold value of the photosensor itself, thereby showing that the last arrived film is at a distance from the photosensor which corresponds to the full condition of the magazine;
repeating the above steps every time a film is fed.

7. Method according to claim 6, wherein the first light signal is generated by a LED.

8. Method according to claim 6, wherein the photosensor is a phototransistor.

9. Method according to claim 7, wherein the LED is fed with different currents to generate in sequence the first and the second IR light signals.

10. A device for detecting at least one condition selected from a) film jammed outside a magazine and b) full magazine conditions in a film receiving magazine of a film handling apparatus, wherein films are driven along a film path to the receiving magazine in which they rest one on the other, characterized by comprising an IR light source and an IR photosensor placed over the magazine and oriented thereto, the light source and the photosensor being tuned so as to have an alarm signal emitted by the photosensor when the intensity of the light collected is greater than a threshold value of the photosensor itself, thereby indicating that the last received film is too near to the photosensor, because of a jam or because the magazine is full.

11. Device according to claim 10, wherein the IR light signal is generated by a LED.

12. Device according to claim 10, wherein the photosensor is a phototransistor.

13. Device according to claim 11, wherein the emitting LED and the phototransistor are mounted in a same case, with a convergence angle of less than 10°.

14. A photographic exposing apparatus which comprises a film feed magazine for feeding photographic film into an exposure site, an exposure site, and a film receiving magazine, wherein said film receiving magazine contains a device for detecting in said photographic exposing apparatus at least one condition selected from a) film jammed outside said film receiving magazine and b) full magazine conditions in said film receiving magazine, wherein photographic films are driven along a light tight film path from the feeding magazine, through said exposure site, to the receiving magazine in which they rest one on the other, said device for detecting comprising an IR light source and an IR photosensor placed over the magazine and oriented thereto, the light source and the photosensor being tuned so as to have an alarm signal emitted by the photosensor when the intensity of the light collected is greater than a threshold value of the photosensor itself, thereby indicating that the last received film is too near to the photosensor, because of a jam or because the magazine is full.

15. The exposing apparatus of claim 14 wherein said IR light source and said photosensor comprise an LED and phototransistor, respectively.

16. The exposing apparatus of claim 15 wherein said LED and phototransistor have a convergence angle of less than 10°.

17. The exposing apparatus of claim 16 wherein said LED and phototransistor are mounted on the same case.

18. The exposing apparatus of claim 14 wherein the light emitted by the IR light source does not create a latent image on the photographic film when light from the light source strikes photographic film in the receiving magazine.

19. The exposing apparatus of claim 14 wherein said photosensor emits two separate intensities of light, one intensity which will be reflected from photographic film in said receiving magazine at an intensity below the threshold of the photoreceptor when the magazine is not full, and a second intensity which will be reflected from a jammed photographic film outside the receiving magazine at an intensity above said threshold, indicating a jam of film outside of the receiving magazine.

* * * * *

UNITED STATES PATENT AND TRADEMARK OFFICE
CERTIFICATE OF CORRECTION

PATENT NO. : 5,311,031
DATED : May 10, 1994
INVENTOR(S) : Gagliardo

It is certified that error appears in the above-indentified patent and that said Letters Patent is hereby corrected as shown below:

Column 4, line 32, delete "film"
and insert --films--.

Column 6, lines 23-24, delete "and photosensor"
and insert --and the photosensor--.

Signed and Sealed this

Fifteenth Day of November, 1994

Attest:

BRUCE LEHMAN

*Attesting Officer*         *Commissioner of Patents and Trademarks*